United States Patent [19]

Montlick et al.

[11] Patent Number: 4,520,499
[45] Date of Patent: May 28, 1985

[54] COMBINATION SPEECH SYNTHESIS AND RECOGNITION APPARATUS

[75] Inventors: Terry Montlick, Somers; Klaus Skoge, Cromwell, both of Conn.; David C. Vetter, Greenfield; Paul R. Ahrens, Longmeadow, both of Mass.

[73] Assignee: Milton Bradley Company, Springfield, Mass.

[21] Appl. No.: 392,309

[22] Filed: Jun. 25, 1982

[51] Int. Cl.³ .............................................. G10L 1/00
[52] U.S. Cl. ...................................... 381/36; 381/43; 381/53
[58] Field of Search .................................... 381/36–53, 381/513.5; 364/724

[56] References Cited

U.S. PATENT DOCUMENTS

| | | | |
|---|---|---|---|
| 3,909,533 | 9/1975 | Willimann | 179/1.5 A |
| 4,032,710 | 6/1977 | Martin et al. | 179/1.5 A |
| 4,052,563 | 10/1977 | Noda et al. | 179/1.5 A |
| 4,158,751 | 6/1979 | Bode | 179/1.5 A |
| 4,216,354 | 8/1980 | Esteban et al. | 179/15.55 R |
| 4,220,819 | 9/1980 | Atal | 179/1.5 A |
| 4,230,906 | 10/1980 | Davis | 179/1.5 A |
| 4,234,761 | 11/1980 | Wiggins et al. | 179/1.5 A |
| 4,271,500 | 6/1981 | Fjallbrant | 179/1.5 A |
| 4,282,405 | 8/1981 | Taguchi | 179/1.5 C |
| 4,301,329 | 11/1981 | Taguchi | 179/1.5 A |
| 4,331,836 | 5/1982 | Wiggins et al. | 179/1.5 A |

OTHER PUBLICATIONS

Flanagan, "Speech Analysis, Synthesis, Perception," Springer, Verlag, 1972, pp. 367–370, 390–393.

Primary Examiner—E. S. Matt Kemeny
Attorney, Agent, or Firm—Cesari & McKenna

[57] ABSTRACT

A reconfigurable lattice filter is employed to permit the same circuitry to function as a speech synthesizer and as a speech analyzer or recognizer. The lattice filter can be configured both as an all-pole filter (for synthesis) and as an all-zero filter (for analysis), with the choice being determined by the state of an analysis/synthesis signal (i.e., mode control signal) provided thereto. The connections between various elements in the circuitry are controlled by the analysis/synthesis signal, also.

In synthesis mode, partial correlation coefficients are supplied to the filter from a microprocessor. The filter is excited by a one of a number of stored patterns simulating a glottal pulse for voiced sounds and by a pseudo-random noise generator for unvoiced sounds.

In analysis mode, appropriate feedback control paths are enabled so as to provide to the filter coefficients which change in response to changes in the input speech waveform. Coefficient values thus determined are averaged over fixed intervals and successions of such averaged coefficient sets produce representations of words or phrases which can then be used for speech recognition.

14 Claims, 15 Drawing Figures

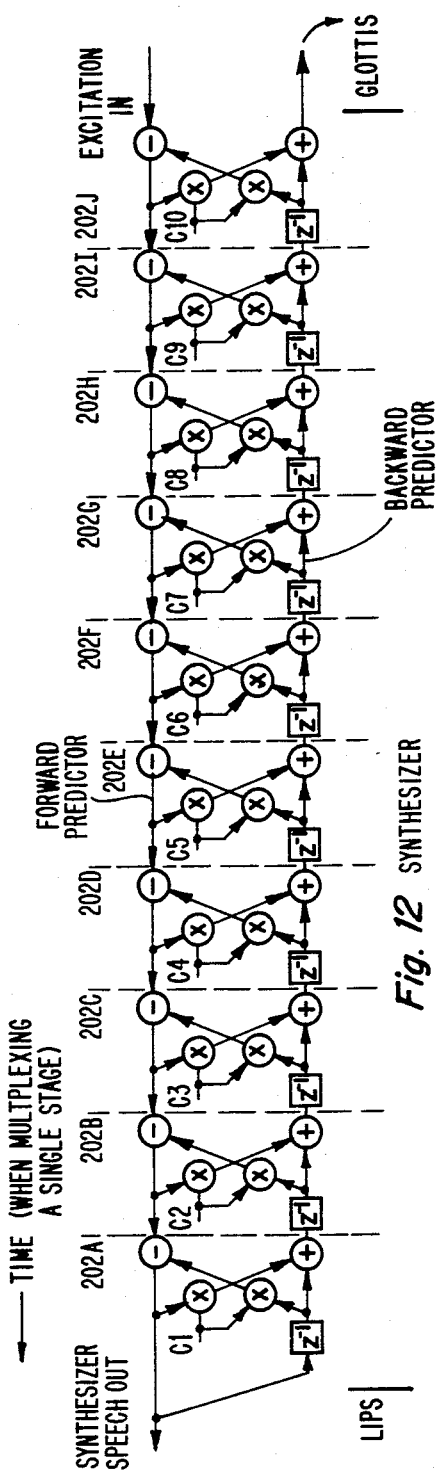
Fig. 12 SYNTHESIZER
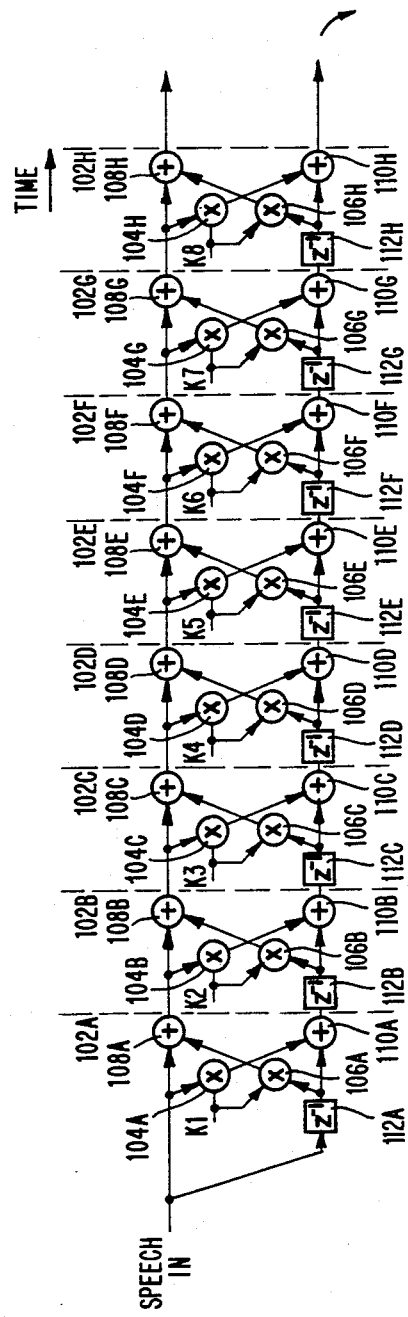
Fig. 11 ANALYZER

4,520,499

COMBINATION SPEECH SYNTHESIS AND RECOGNITION APPARATUS

FIELD OF THE INVENTION

The present invention relates to speech synthesis and recognition systems and, more particularly, to an electronic circuit which uses a single reconfigurable lattice filter to perform both speech synthesis and speech analysis for the purpose of recognition, and which is suitable for integration onto a single semiconductor chip.

BACKGROUND OF THE INVENTION

Various techniques and circuits are known in the prior art for speech synthesis and for speech recognition. Indeed, there is extensive literature describing numerous designs and products utilizing them. An excellent reference source is L. R. Rabiner and R. W. Schafer, *Digital Processing of Speech Signals*, Prentice-Hall 1978, though this area of technology is in a great state of motion and no all-inclusive reference exists.

These various prior approaches separate those two functions and require separate apparatus for speech synthesis and separate apparatus for speech analysis and recognition.

One prominent class of techniques for synthesis uses an excitation to drive a filter having resonances which are those of the formants of the speech signal to be synthesized. The excitation driving the filter simulates either the periodic pulses produced at the glottis for voiced sounds, or the turbulent noise produced at constrictions formed by the glottis or tongue for unvoiced sounds. Speech characteristics are formed from the interplay between this excitation and time-varying filter resonances. The resonances of natural speech change not only from one speaker to another but also from one instant to another for the same speaker, according to changes in the size and shape of the physical structures which produce these resonances, such as the cavities of the mouth and pharynx. Since the changes in both resonances and excitation are slow compared to the bandwidth of the speech signal, the use of the time-varying parameters to characterize the speech results in a savings in information for this type of synthesizer, making it attractive for low-cost synthesis or synthesis requiring only a low data rate.

A key feature of the above type of speech synthesizer is that a filter which has only a limited number of resonances (i.e., poles), and no antiresonances (i.e., zeros) may be employed to accurately reproduce a speech signal. In fact, antiresonances do occur in speech (due, for example, to the parallel resonance of the nasal cavity), but such antiresonances can either be modeled adequately by extra poles, or introduced into the excitation function which drives the filter. Thus it is possible to make use of an "all-pole" filter to model the behavior of the vocal tract for the purpose of speech synthesis.

The techniques of linear predictive coding (LPC) provide means for analyzing a speech signal to produce the appropriate filter coefficients for controlling an all-pole filter.

A speech analyzer may make use of the same "all-pole" model of the vocal tract which speech synthesizers use, but in reverse. If a speech analyzer can "remove" resonances in a speech signal by introducing antiresonances which cancel them out, then it can as a consequence derive features characterizing the resonances of the speech signal, which can then be used for the purpose of speech recognition by matching to similar features stored for a library of the words to be recognized.

LPC analysis techniques such as the autocorrelation or covariance methods can be used to derive parameters for such a filter; however adaptive LPC techniques (i.e., LPC techniques which function on a continuous or sample-by-sample basis, rather than on whole blocks of data) are also known. An adaptive filtering technique has the advantages that (1) large blocks of input data need not be stored, and (2) relatively simple feedback schemes can replace explicit numerical computation. Adaptive techniques are known under the names of adaptive array theory, correlation cancelling loops, the least meansquares algorithm, and most recently, adaptive LPC. The basic idea is that of an all-zero filter which adapts so as to remove correlations (due to resonances) in the incoming signal. The resonances are cancelled out so that what comes out the end of the filter is essentially the original excitation to the all-pole filter which produced the signal. Cancelling the resonances is mathematically equivalent to eliminating the correlation between the forward and backward prediction errors for each stage of the filter.

The aim of the control scheme in an adaptive LPC analyzer is to eliminate such correlation. This can be done by generating a correlation signal, either positive or negative, which is used as an error signal in a feedback loop so as to adjust the filter coefficients in the right direction. This technique is prior art and is known under a variety of names, such as the least mean-squares algorithm and the correlation cancelling loop. Otherwise stated, the idea is to generate an adjustment to the then-current PARCOR (i.e., partial correlation) coefficient which is proportional to the negative of the product of the forward residual out of the stage and the backward residual for that stage.

The same filter transfer function may be realized with a variety of filter forms. One such form which has desirable properties for both speech synthesis and analysis is the so-called "lattice" form. An example of the all-pole form for this filter is shown in FIG. 12, while the all-zero form is shown in FIG. 11. The all-pole lattice filter for synthesis shows relative insensitivity to quantization of the filter coefficients, meaning that relatively coarse quantization may be used for a low-cost synthesizer with this form of filter. An adaptive all-zero analyzer of the lattice form is superior in speed of adaptation to other filter forms. In addition, the coefficients which it derives, the PARCOR coefficients, are orthogonal and may be used successfully in their original form for pattern matching in speech recognition, unlike the coefficients one gets from a direct form adaptive filter, for example.

A significant problem with adaptive lattice type filters for speech analysis circuits, however, is their size. In addition to needing a multiplicity of filter stages and other signal processing circuitry, such filters have needed extensive circuitry for adaptively generating the filter coefficients. This coefficient-generating circuitry has required multiplier circuits which occupy substantial area on an integrated circuit, in addition to the multipliers needed by the filter itself. Thus, so far as we are informed, no one has succeeded in producing an adaptive lattice-filter type speech analyzer on a single integrated circuit "chip" using LSI technology. Of course, it follows that no one has put both such an analyzer and a synthesizer on the same chip.

SUMMARY OF THE INVENTION

The present invention pertains to apparatus which performs both speech synthesis and speech analysis for the purpose of automatic speech recognition. The combination of synthesis and analysis is achieved by exploiting the functional duality of the two forms of the lattice filter, the all-zero and all-pole forms. This permits a common reconfigurable filter to be used for both synthesis and analysis. As a result, both functions can be provided on a single integrated circuit "chip".

A number of important but subsidiary design features, such as in the area of gain control, enhance the performance of this device substantially. These are discussed in greater detail below.

When used in synthesis mode, the lattice filter is configured in all-pole form and is presented with PARCOR coefficients of the speech sound to be synthesized at a particular instant in time. These coefficients may be updated either synchronously with the pitch period for voiced sounds, or asynchronously at fixed time intervals. The excitation for the filter in the speech synthesis mode is provided by a pseudo-random noise generator for unvoiced sounds, or from one of a number of stored patterns simulating a glottal pulse for voiced sounds.

When used in speech recognition mode (i.e., for analysis), the lattice filter is configured in all-zero form and appropriate feedback control paths are enabled so as to produce an adaptive filter whose coefficients change in response to changes in the input signal. The input to the filter is the speech to be analyzed. The coefficient values thus determined, averaged over fixed intervals, form a robust characterization of the speech signal that can be used for speech recognition. A succession of such averaged coefficient sets produce representations of words or phrases which can then be used with appropriate time normalization and comparison procedures to match previously stores "templates" in order to recognize a word or phrase.

This invention is pointed out with particularity in the appended claims. The above and further objects and advantages of the invention may be better understood by referring to the following description, taken in conjunction with the accompanying drawings.

BRIEF DESCRIPTION OF THE DRAWING

In the drawing:

FIG. 11 is a flow graph of the lattice filter 20 as configured for analysis;

FIG. 12 is a flow graph of the lattice filter 20 as configured for synthesis;

DESCRIPTION OF AN ILLUSTRATIVE EMBODIMENT

Figure 1:
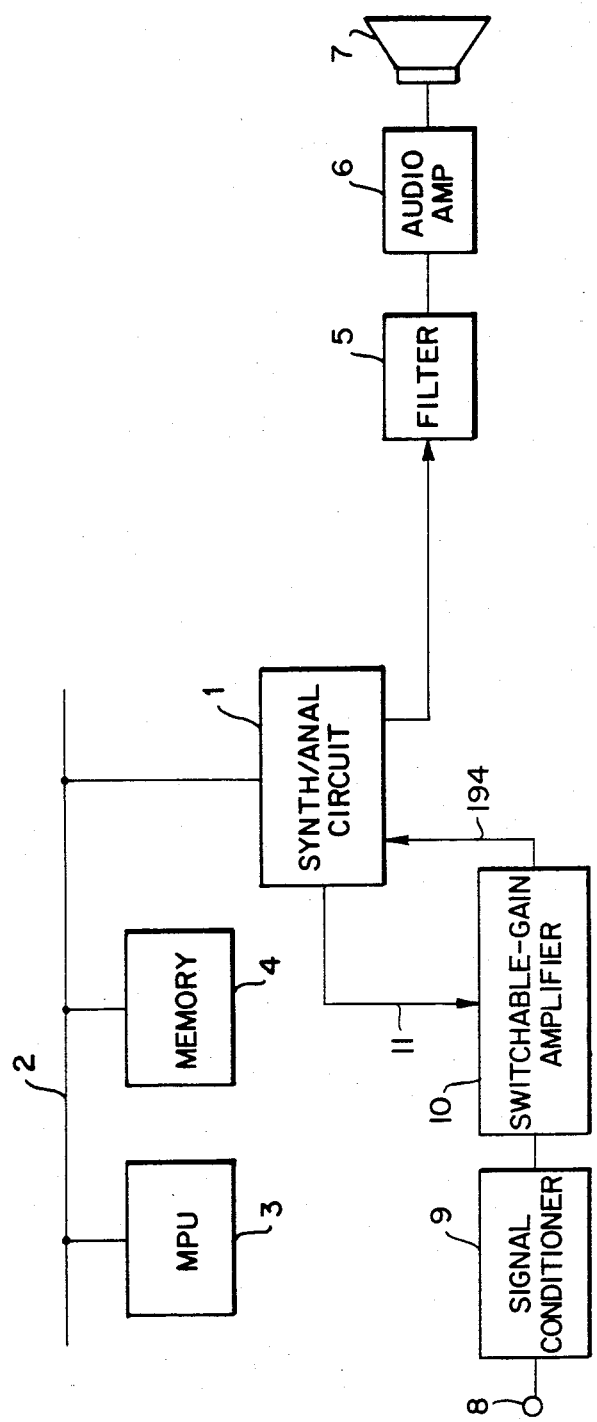
FIG. 1 is a block diagram of a speech synthesizer/recognizer incorporating the present invention (i.e., speech synthesis/analysis (S/A) circuit 1)

A block diagram of a synthesizer/recognizer incorporating the invention is shown in FIG. 1. Thus, the synthesis/analysis circuit (S/A Circuit) 1, which is the primary focus of the invention, communicates over a bus 2 with a (micro)processor unit (MPU) 3 and a memory 4, in a standard arrangement. In synthesis mode, the S/A Circuit 1 provides output to a filter 5, audio amplifier 6 and speaker 7, for producing sounds. In recognition mode, audio input is obtained via a microphone 8 and signal conditioner 9; the signal conditioner output is amplitude adjusted by a switchable gain amplifier 10 and supplied to S/A Circuit 1. The latter generates parameters characterizing the speech input.

The gain setting of switchable gain amplifier 10 is dependent upon the amplitude of the input signal and the dynamic range of S/A Circuit 1; a gain control signal is provided by S/A Circcuit 1 via line 11.

Figure 2:
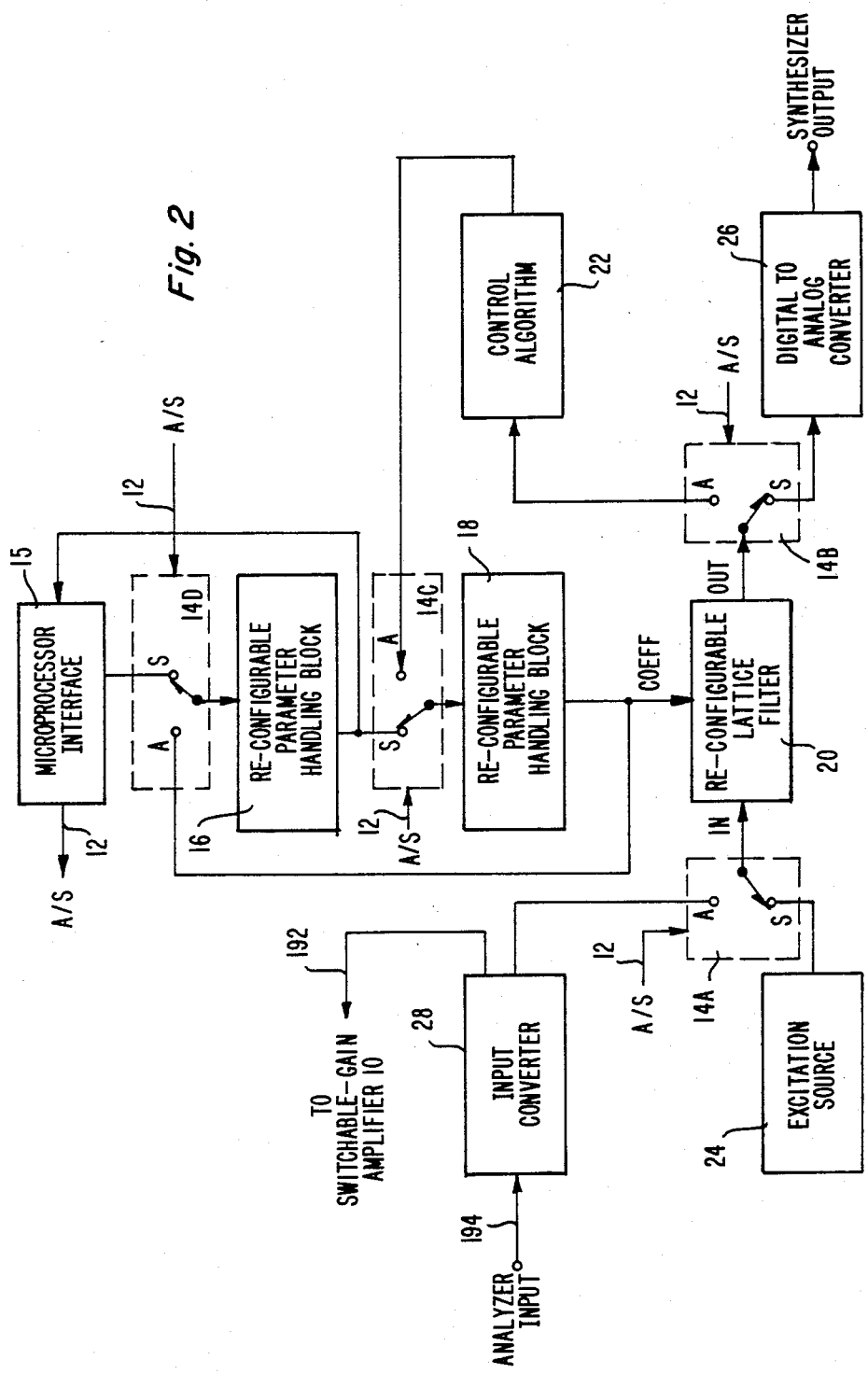
FIG. 2 is a block diagram of the S/A circuit 1 of FIG. 1.
Figure 3:
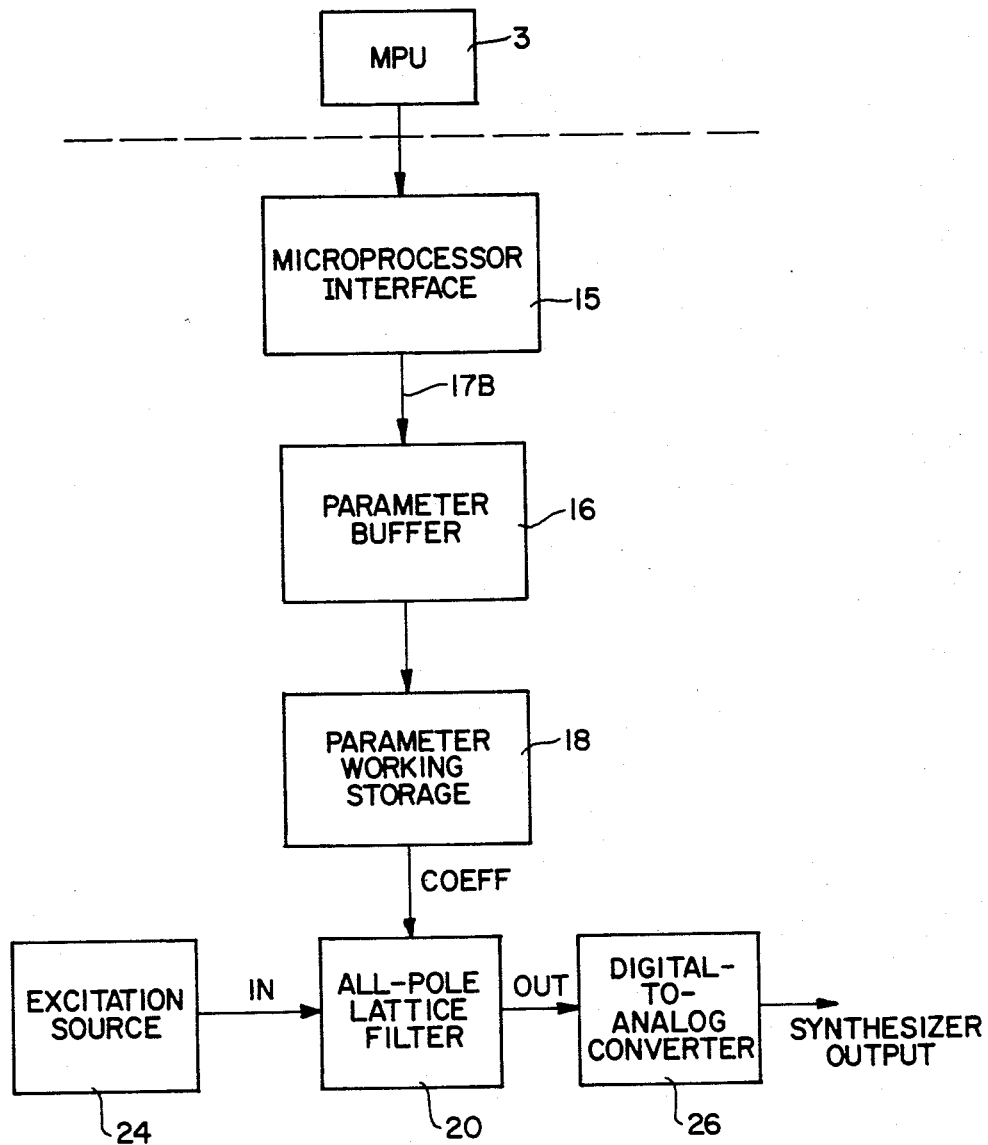
FIG. 3 is a modified form of the block diagram of S/A circuit 1 of FIG. 2, showing how it is configured for use as a speech synthesizer.
Figure 5:
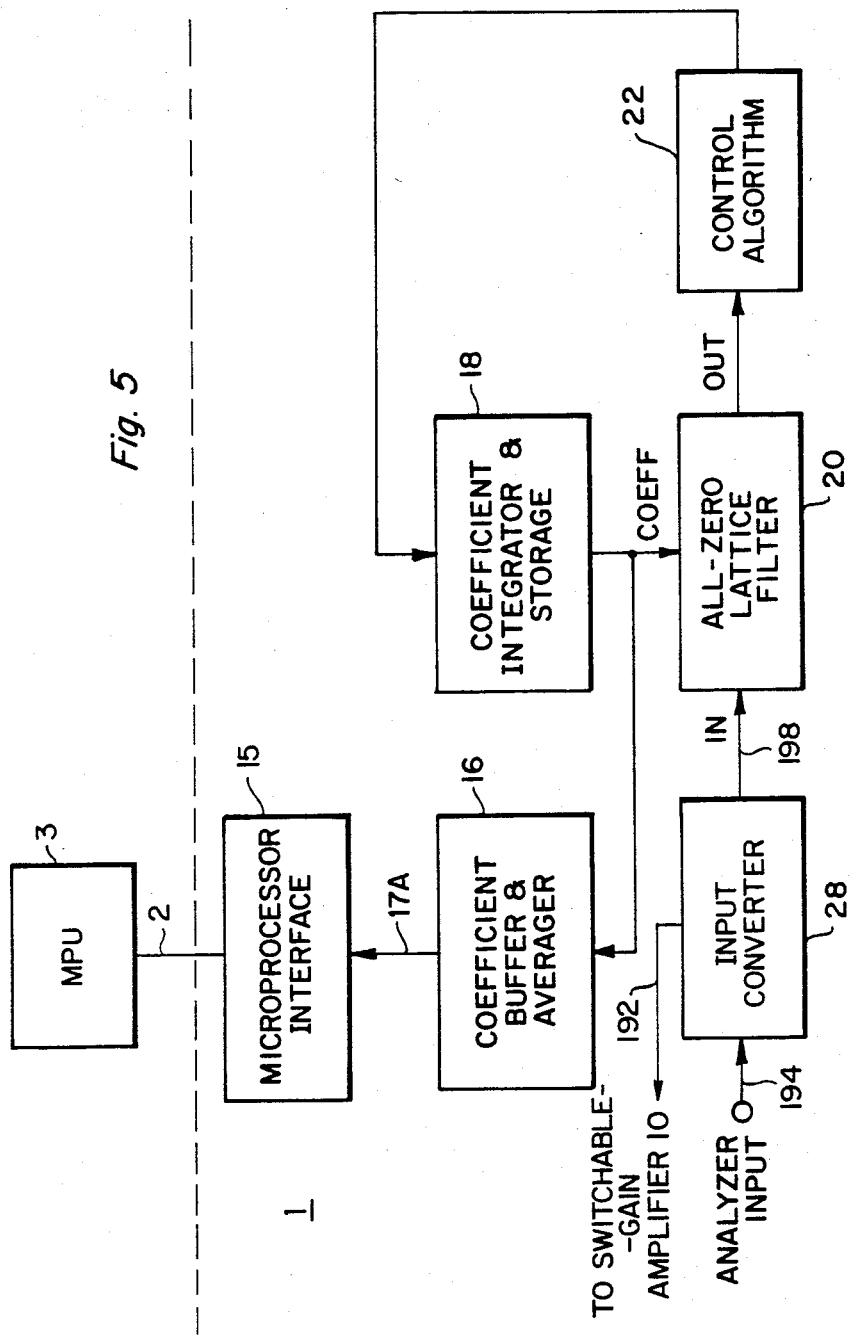
FIG. 5 is a modified form of the block diagram of S/A circuit 1 of FIG. 2, showing how it is configured for use as a speech recognizer or analyzer.

A block diagram of S/A Circuit 1, is shown in FIG. 2. It shows reconfigurability on two levels. The first level is accomplished by a gang of switches 14A–14D, which alter the interconnections between some of the blocks. The second level of reconfigurability is internal to three of the blocks. FIGS. 3 and 5 separately illustrate the block diagrams which apply to the two configurations, one for synthesis and one for analysis, respectively.

As depicted in FIG. 2, the synthesizer/analyzer circuit 1 comprises, in addition to switch gang 14A–14D, a microprocessor interface 15, a pair of re-configurable parameter handling blocks 16 and 18, a re-configurable lattice filter block 20, a control algorithm 22, an excitation source 24, a digital-to-analog converter 26 and an input converter 28. All of these elements can be implemented on a single integrated circuit chip, although it may be economically advantageous to implement all or part of block 28 and/or block 26 outside the chip. The functions and construction of each block will be described below, separately for each configuration - i.e., synthesizer, and analyzer. It should be understood that in FIG. 2, switch gang 14A–14D is shown in position "S" (for synthesizer) which is used for synthesis, and that the alternate position "A" (for analyzer) is used for analysis. The state of switches 14A–14D is determined by the state of an analysis/synthesis (A/S) signal provided by microprocessor 3 via microprocessor interface 15 on line 12.

SYNTHESIS CONFIGURATION

FIG. 3 shows a version of FIG. 2 adapted for use as a synthesizer. Switch gang 14A–14D does not appear explicitly, but its existence is understood from FIG. 2 (thrown to position "S"). Blocks not germane to the synthesis function have been omitted. The microprocessor interface block 15 receives a set of precalculated filter parameters from the microprocessor 3. The parameters are received one at a time, at a speed determined by the microprocessor, and stored in the parameter buffer 16, replacing or modifying parameters previously provided. At the appropriate time, the entire set of parameters is transferred to the parameter working storage 18. Among these parameters are the filter coefficients, which are applied to the lattice filter 20 in a fixed sequence which repeats once each sample period.

The lattice filter 20 performs the function of an all-pole, multiple-stage filter by receiving one input sample from the excitation source 24 and using the coefficients from the parameter working storage 18 to produce one output sample for each sample period. The excitation source 24 is capable of producing various complex waveforms in sampled form under the control of the microprocessor. A bit field within a register in parameter working storage 18 determines which waveform the excitation source will produce, while another determines the overall amplitude of the input waveform. If the filter coefficients and input sample values vary appropriately as a function of time, the sequence of output samples represents synthesized speech. Digital-to-analog converter (DAC 26) converts these output samples into a continuous speech signal.

Figure 4:
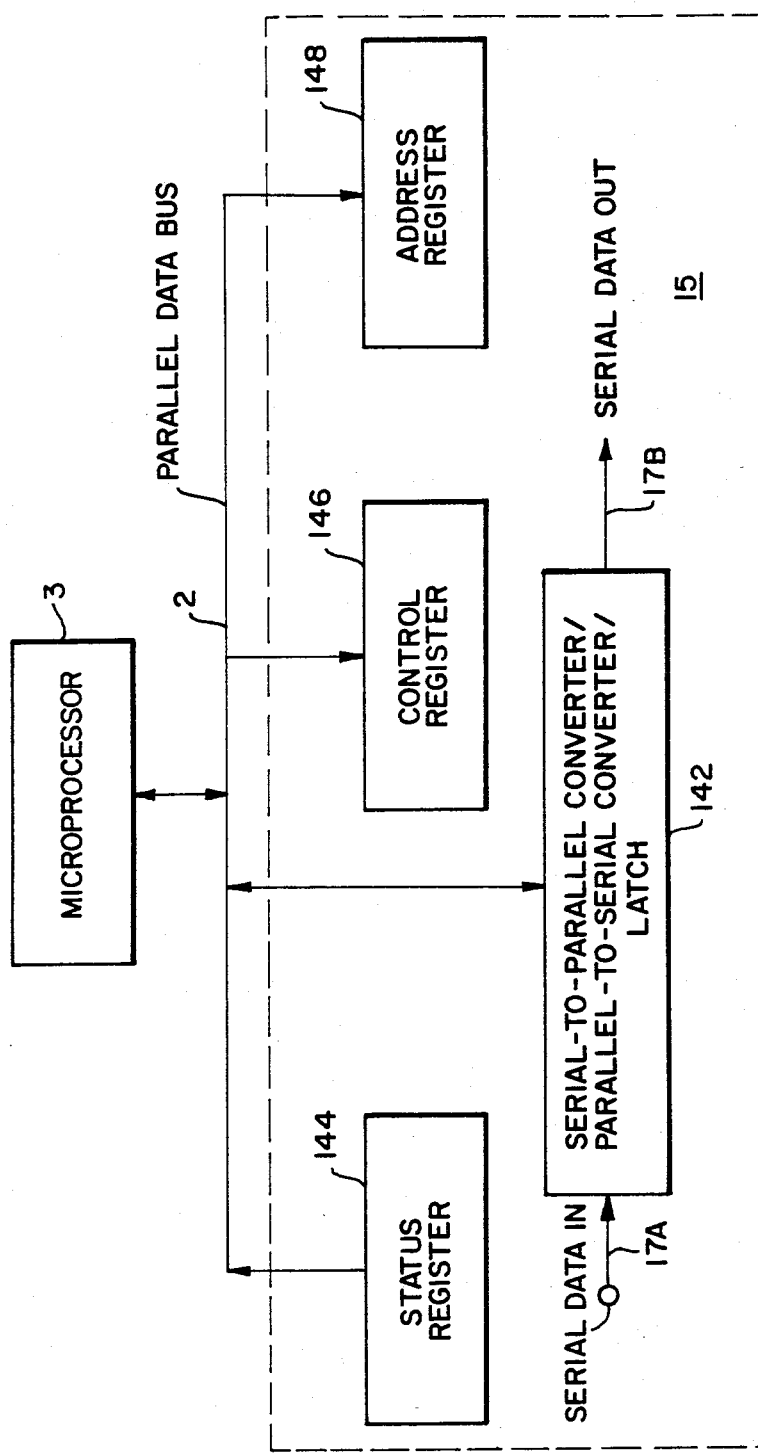
FIG. 4 is a block diagram of the microprocessor interface 15 of the S/A circuit 1 of FIG. 2.

The aforementioned registers in the parameter handling blocks 16 and 18 each contain two timer fields in addition to the fields already discussed. Henceforth these timer fields will be referred to as Timer A and Timer B. In block 18 these fields are decremented once during each sample period, while in block 16 they contain preset values determined by the microprocessor. When either timer in block 18 underflows, it is automatically loaded with the contents of the corresponding field in block 16. In synthesis mode, Timer A serves as the pitch-period timer; during synthesis of voiced segments of speech, the excitation source block 24 begins a new excitation sequence each time Timer A underflows. Underflow in either timer can trigger the transfer of synthesis parameters from block 16 to block 18; a bit in control register 146 of microprocessor interface 15) (see FIG. 4) determines which underflow is relevant. It is thus possible to change the filter parameters independently of the pitch-period by choosing Timer B underflow as the trigger for the transfer. It should be clear that the timer fields themselves are not transferred from block 16 to block 18 along with the rest of the parameters; they are transferred only when they underflow.

There is provision for generating interrupts to the microprocessor when either timer underflows. The microprocessor can enable these interrupts individually by setting appropriate bits in control register 146. In any case, underflow in either timer sets a corresponding bit in status register 144. Thus the timers can function as general-purpose timers when they are not being used for synthesis or recognition.

A comparison between FIGS. 2 and 3 shows that in the synthesis configuration, the two general parameter handling blocks 16 and 18 are functioning as parameter buffer and parameter working storage, respectively. Further it is seen that two of the blocks in FIG. 2, input converter 28 and control algorithm 22, are not part of the synthesis configuration shown in FIG. 3.

ANALYSIS CONFIGURATION

FIG. 5 shows the block diagram of the analyzer configuration of S/A Circuit 1 (i.e., FIG. 2 with switch gang 14A–14D in position "A") and extraneous blocks omitted. Lattice filter 20, now configured as an all-zero filter, receives a speech signal furnished by input converter 28 as one sample every sample period. Filter coefficients are furnished by parameter handling block 18, which in this configuration serves as coefficient integrator and storage. Output from the filter 20 is directed to the control algorithm block 22, the output of which is directed black to the coefficient integrator and storage block 18, thus forming a closed loop data flow. The nature of this closed loop is discussed below to explain the functioning of the analyzer. The output of interest from the analyzer is a set of filter coefficients from coefficient integrator and storage 18. These are fed as inputs to parameter handing block 16, which in this configuration serves as a coefficient buffer and averager. From there they are sampled by the microprocessor 3 through the microprocessor interface 15.

Figure 6:
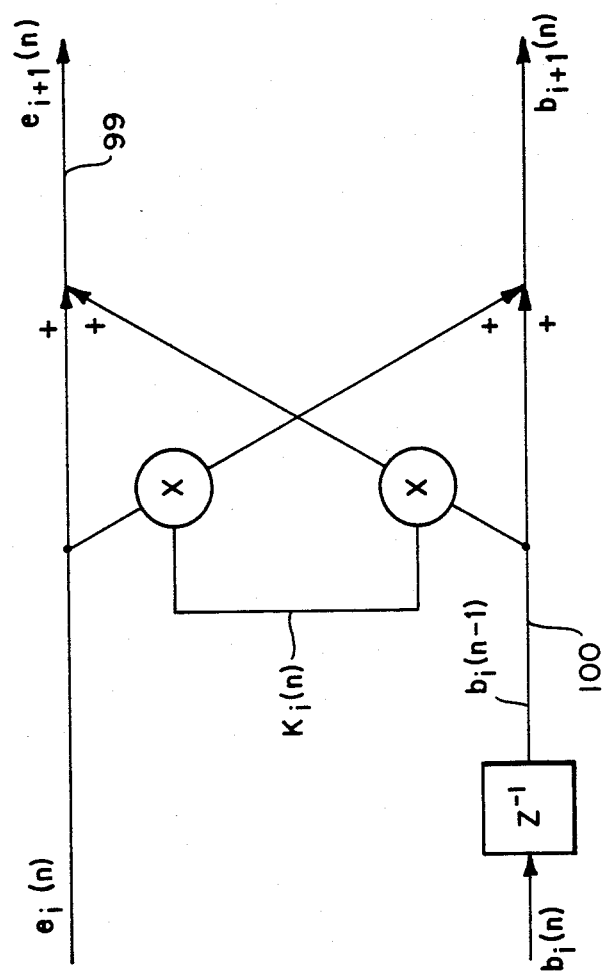
FIG. 6 is a flow graph for one stage of a lattice filter 20 of FIG. 2.

The closed loop data path mentioned above forms a feedback control system with an integrator in its feedback loop. It functions as follows: For each section of the filter, a particular measurement is made. For each measurement, a correction signal of proper polarity and magnitude is determined. The correction signal for each section is applied to an integrator, one per section; the output of the integrator is the filter coefficient value for that particular section. This process is repeated every sample period. The amount of correction determined for a particular coefficient in one particular sample period is applied during the next sample period. The result is that the coefficient integrator block contains a "live" set of coefficients, updated every sample period to reflect changes in the parameters of the incoming speech waveform. Referring to FIG. 6, the generation of coefficients for a stage can be expressed as:

$$k_i(n+1) = k_i(n) - Ce_{i+1}(n)b_i(n-1)$$

where $k_i(n)$ is the coefficient for stage n, C is a proportionality constant, $e_{i+1}(n)$ is the forward prediction error at the output of the stage, and the $b_i(n-1)$ is backward prediction error at the input of the stage.

A simpler control scheme can eliminate the numerical multiplication needed for the above computation. This is accomplished by using a sign multiplication instead, in which the sign of the backward residual replaces its actual value, thus:

$$k_i(n+1) = k_i(n) - Ce_{i+1}(n)\ SGN\ [b_i(n+1)],$$

wherein SGN [] means the sign of the argument inside the brackets. This has been found to give speech recognition accuracy not significantly different from that of the full numerical multiplication scheme.

The above result is important for a low-cost implemenation of an adaptive lattice filter analyzer. Since a multiplication by a sign is really just a conditional negation and not a commentional multiplication, one multiplication per lattice stage is saved as compared with a conventional implementation of an adaptive analyzer.

By the above scheme, the first step in constructing the correction signal for the Nth stage of the filter is to determine the polarity of the backward prediction error $b_i(n-1)$ of the stage as shown in FIG. 6. If the polarity is negative, the correction signal is the value of the forward prediction error coming out of that stage, $e_{i+1}(n)$, scaled down by a certain factor, C. Otherwise it is that same value but with opposite polarity. Alternatively stated, the value of the correction signal for a particular stage is a constant times the value of the forward prediction error at the output of the stage, sign-multiplied by the sign of the backward prediction error at the input to the stage.

It is important for accurate recognition that the lattice filter's response be relatively independent of the amplitude of the input speed signal. Since the magnitude of the correction signal is dependent on the magnitude of the forward prediction error, the adaptation response time of the filter will also be dependent on it. As the magnitudes of the prediction errors are proportional to the magnitude of the input speech signal, this signal can be normalized in order to provide adaptation time which is not dependent on the amplitude of the speech signal.

In order to perform such amplitude normalization, input converter block 28 integrates the absoluted value (i.e., magnitude) of the input speech signal over a particular fixed interval. At the end of this interval, input convertor block 28 adjusts the gain of external switchable-gain amplifier 10 via line 192, based on this integrated amplitude so as to normalize input on line 198 to lie within a predetermined range.

Amplitude normalization is accomplished by gain control logic inside the input converter block 28, which supplies a control code to the external switchable-gain amplifier 10 to select the appropriate gain setting as a function of time. The gain control logic employs two different mechanisms. The main mechanism periodically determines a new current gain setting, based on the absolute value of the speech signal integrated over a particular number of samples. A second mechanism modifies the "current" gain setting by one step in the direction of less gain whenever an input signal exceeding the range of the ADC is detected. This secondary mechanism is necessary to follow the rapid increase in speech signal at the beginnings of many speech sounds. (The integral, serving as a measure of the energy in the speech signal, is also made available to the microprocessor for use in the word framing, i.e., for use in detecting the start and end of a spoken word).

The gain control is done using discrete gain steps. Powers of two gain steps are used since they are easy to control digitally and have been found to provide adequate resolution for high quality speech recognition. The gain may be updated at the rate of once every 10 milliseconds, with the current gain setting based on the average amplitude over the previous 10 milliseconds. This period need not be synchronized to the coefficient averaging period, since the effect of an instantaneous change in input amplitude to the adaptive analyzer is sufficiently filtered by the coefficient integrator so as not to have a significant impact on the derivation of a coefficient.

A byproduct of this gain control scheme is that an amplitude coefficient consisting of a base 2 exponent and a mantissa may be accumulated over the course of a frame of speech, and this coefficient passed to the microprocessor along with the lattice coefficients. Such an amplitude coefficient can be used in an amplitude based word framer (i.e., endpoint detector).

Comparing FIG. 5 to FIG. 2 shows that excitation source 24 and output converter 26 are not part of the analysis configuration. Further it is seen that the reconfigurable coefficient handling block 16 is functioning as both buffer and averager and that the other reconfigurable coefficient handling block 18 serves as integrator an storage.

DESCRIPTION OF MAJOR BLOCKS

FIG. 2 details the major functional blocks in the device. In this description, the terminology pertaining to digital serial logic is used; however, it is noted that FIGS. 7 through 10 may be interpreted either as schematic diagrams for actual circuits or as flow graphs using symbols to show functions of blocks. It is clear that such functions may be implemented in any technology in which physical counterparts to the symbols exist.

Parameter Handlers

Figure 7:
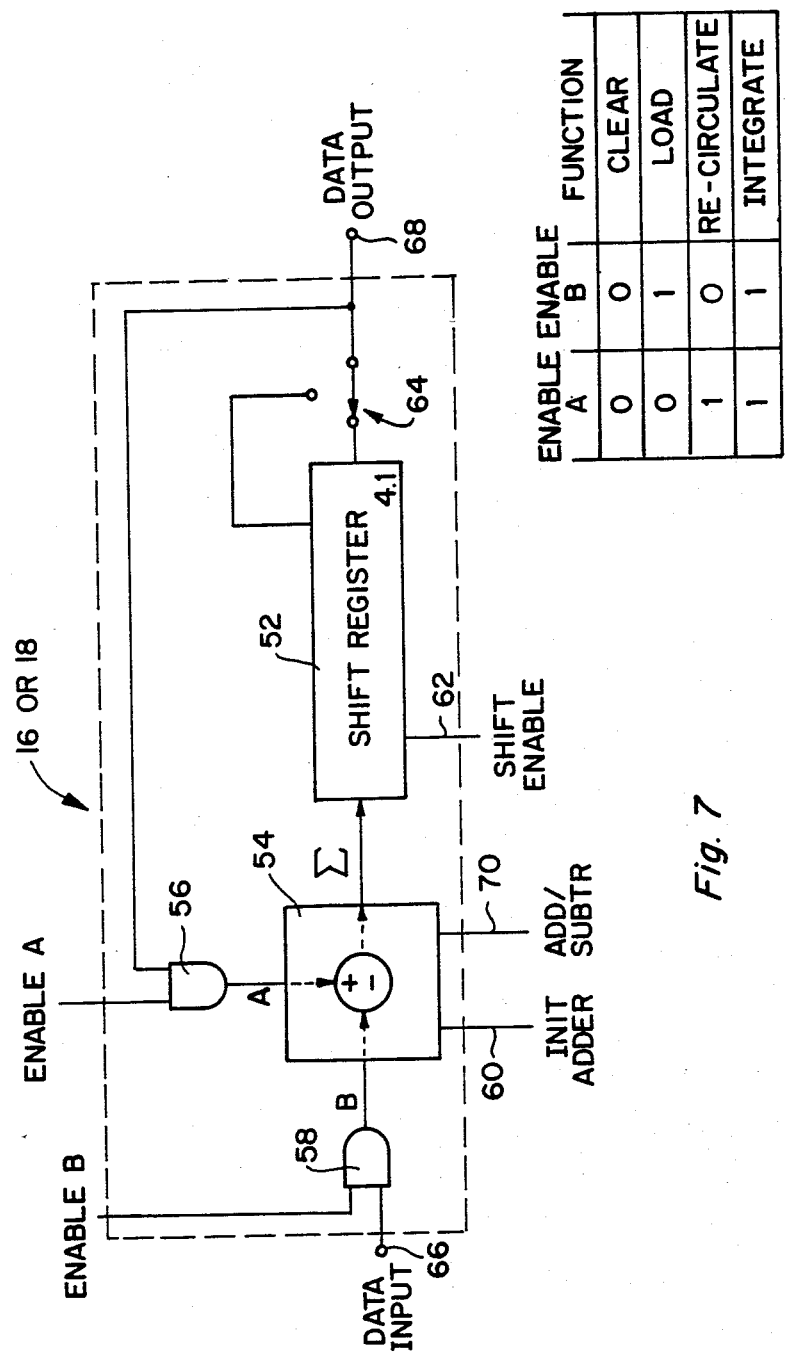
FIG. 7 is a block diagram of the internal structure of parameter handlers 16 and 18 of FIG. 2.

Blocks 16 and 18 are reconfigurable. The parameter (i.e., coefficient) handler blocks 16 and 18 shown in FIG. 7 are identical. The central component in each is a long shift register 52 recirculated through a programmable adder/substrator 54, hereafter referred to simply as an adder. The A-input to the adder 54 is controlled by gate 56 and the B-input is controlled by gate 58. The gates are in turn controlled from the outside of the block. Each gate can be either "open" or "closed". When a gate is closed, its output has the value zero. By selective control of the two gates, four different functions, or modes, may be programmed for the block, as defined by the following table.

| Gate: | 56 | 58 | Function (Mode) |
|---|---|---|---|
| | closed | closed | clear |
| | closed | open | load |
| | open | closed | re-circulate |
| | open | open | integrate |

Shift register 52 holds the required number of parameters, each with the required precision, according to the chosen configuration. Precision refers to the number of binary digits, bits, needed to represent a parameter. Typical numbers may be ten coefficients each nine bits long for synthesis, and eight coefficients each twelve bits long for analysis. Reconfiguring the number and size of the parameters is especially easy using the serial digital technique whereby the size of a particular field is defined solely by timing; i.e., by the time relationship of the two signals INIT ADDER, on line 60 and SHIFT ENABLE on line 62. Selector switch 64 changes the length of the data path since the total number of bits is different for the two configurations.

The programmable modes of the parameter handling blocks, defined in the table above, are now explained in greater detail. In the "clear" mode, all coefficients are set to the value zero. In the "load" mode a value (i.e., coefficient field), presented in serial form at the input 66 of the block at a particular time, will be loaded into the particular field of the shift register being circulated through the adder 54 at that time. "Recirculate" means that the coefficients are being shifted through the register without any modifications, for the sole purpose of being presented at the output 68 of the block at the proper time and in proper sequence. Finally the mode "integrate" means that an external value, applied to the input 66 at a particular time, is added to or subtracted from the field being circulated through the adder at the time. Whether the external value is added or subtracted depends on the state of the ADD/SUBTR signal on control line 70.

In the synthesis configuration of the system, shown in FIG. 3, the parameter buffer 16 is implemented by one parameter handler block normally being programmed for recirculate mode. Each time the microprocessor sends a new parameter value, the microprocessor interface 15 latches it in register 142 (of FIG. 4) and waits until the corresponding field in shift register 52 (FIG. 7) of parameter buffer 16 reaches the input to gate 56 (and simultaneously output 68). It then switches the handler block 16 (labelled parameter buffer in FIG. 3) to load mode and shifts the new parameter out along path 17B into data input 66 (FIG. 6) of block 16, to replace the old field in the parameter handler (buffer). When the replacement is complete, parameter handler 16 (FIG. 3.) is switched back to recirculate mode, and register 142 is available to receive another parameter value.

Alternatively, under microprocessor control, the parameter handler block 16 can switch to integrate mode rather than load mode while the appropriate field is feeding back into gate 56. In this case, the contents of register 142 adds to the circulating field rather than replacing it. The microprocessor chooses between load and integrate by setting a load/integrate bit in control register 146.

The parameter working storage element 18 is likewise implemented using the other parameter handler block. This block is also normally in recirculate mode, but is switched to load mode when the appropriate time underflows, as detailed above. It remains in load mode just long enough to effect the transfer of the entire set of parameters (excepting the time fields) from block 16.

Since each filter parameter must be available to the lattice filter once during each sample period, the contents of the parameter working storage block 18 must make one complete cycle per sample period, such that each parameter appears on output 68 once during each sample period. Furthermore, to properly effect the transfers between them, blocks 16 and 18 must operate in synchronism; therefore, the contents of block 16 likewise recirculate at the sample frequency.

The analysis configuration is shown in FIG. 5, as noted above. Here the coefficient buffer and averager 16 is implemented by the first coefficient handler block (see FIG. 7) normally being programmed for integrate mode. As each integrated value is sampled by the microprocessor 3 the corresponding field of the shift register 52 is reset by changing the mode to "load" for the next occurrence of that particular coefficient. This completes the average function since the division is performed by the microprocessor. The integrator and storage block 18 (FIG. 5) is another coefficient handler block (FIG. 7) operating in integrate mode. Here the fact that the sign of the integration can be programmed, by choosing add or subtract as the function for the adder/subtractor 54, is used to implement part of the control algorithm.

As in the synthesis configuration, blocks 16 and 18 (FIG. 5) must recirculate at the sample frequency, since the filter feeds a new value for each filter coefficient into the integrator once each sample period.

Thus, as shown, the internal re-configuration described above makes it possible to use the same two identical blocks 16 and 18 to support the lattice filter block for both synthesis and analysis purposes. It also makes implementing the two timers particularly easy: a '1' is simply subtracted from each timer field every time it recirculates through adder 54 in block 18. Underflow in a timer field causes the block to enter load mode when that field comes around again, such that it receives the contents of the corresponding timer field from block 16.

In addition to the paths shown in FIGS. 2, 3 and 5, it is possible for the microprocessor to load, modify or read individual fields in either of the parameter handler blocks 16 or 18 directly via microprocessor interface 15. The contents of address register 148 (FIG. 4) determine which field in which block is to be accessed. For example, the microprocessor can load any field in either parameter block at any time by setting register 148 to point to that field and then placing the desired load value in register 142. When the transfer from latch 142 into the desired field in complete, address register 148 increments automatically to point to the next field in the same block, making it possible for a sufficiently fast microprocessor to load successive fields in a block without waiting for the contents of the block to make a complete cycle. Status register 144 provides information sufficient for the microprocessor to synchronize its accesses with the circulation of the fields in blocks 16 and 18.

Lattice Filter

Figure 8:
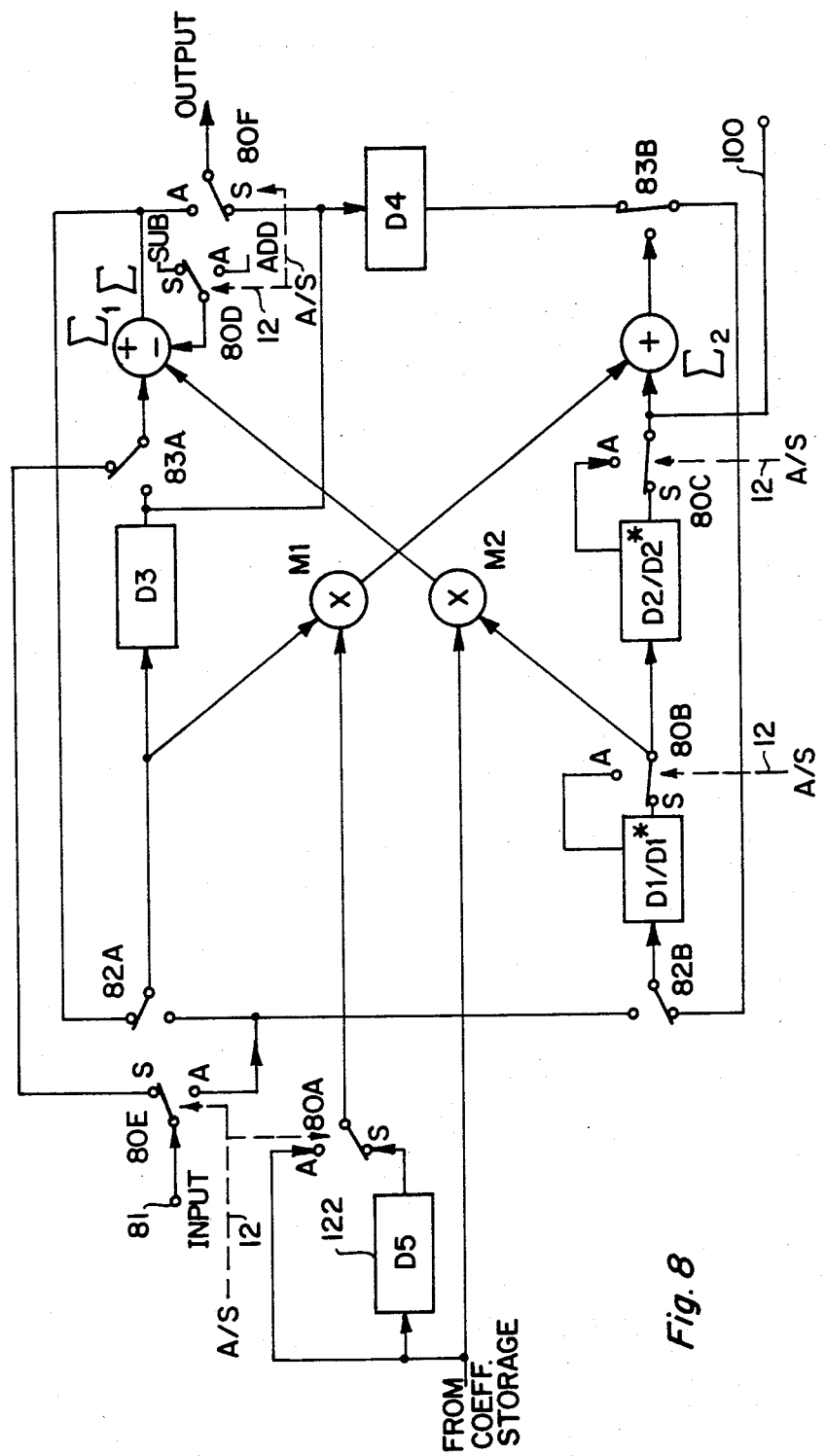
FIG. 8 is a block diagram of the lattice filter 20 of FIG. 2, with switches 80A–80D shown in the synthesis position.
Figure 9:
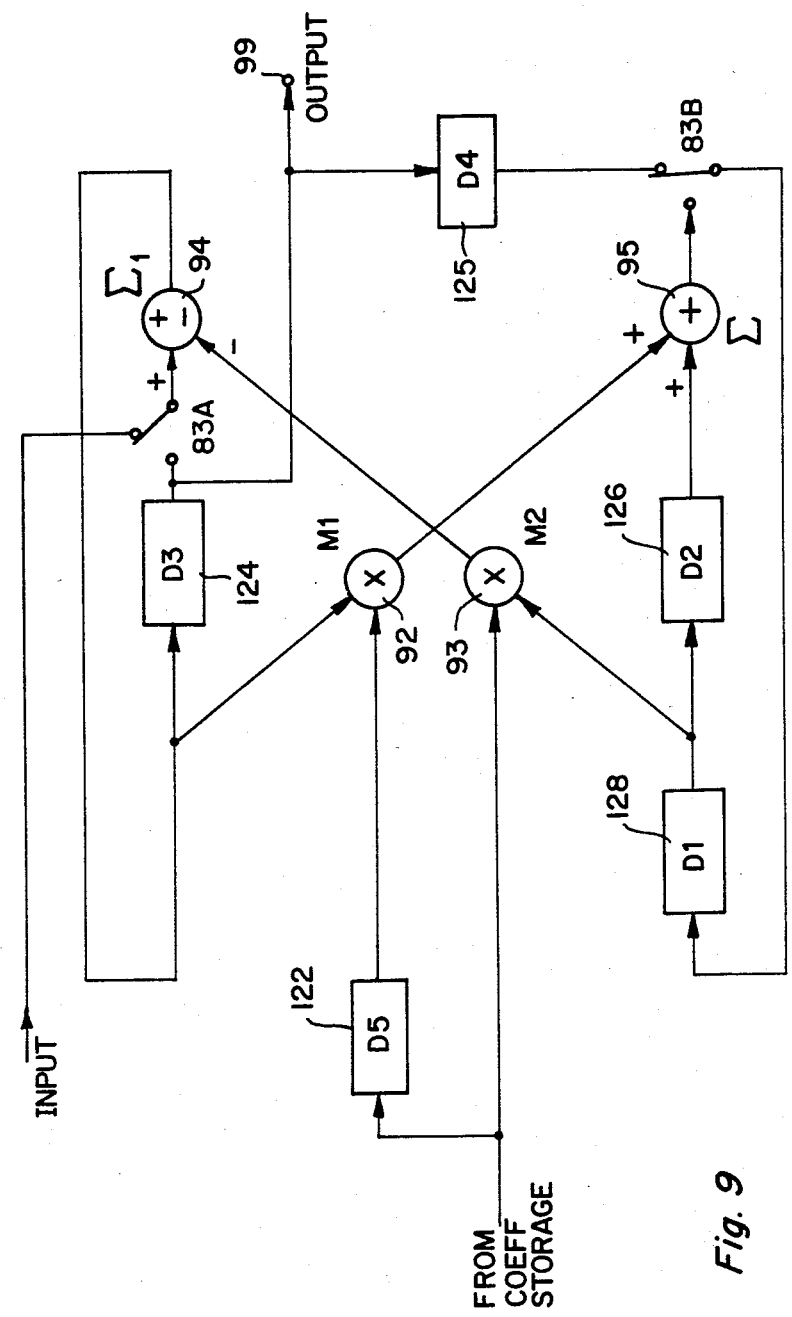
FIG. 9 is a modified form of the lattice filter block diagram of FIG. 8, showing the filter as configured for synthesis.
Figure 10:
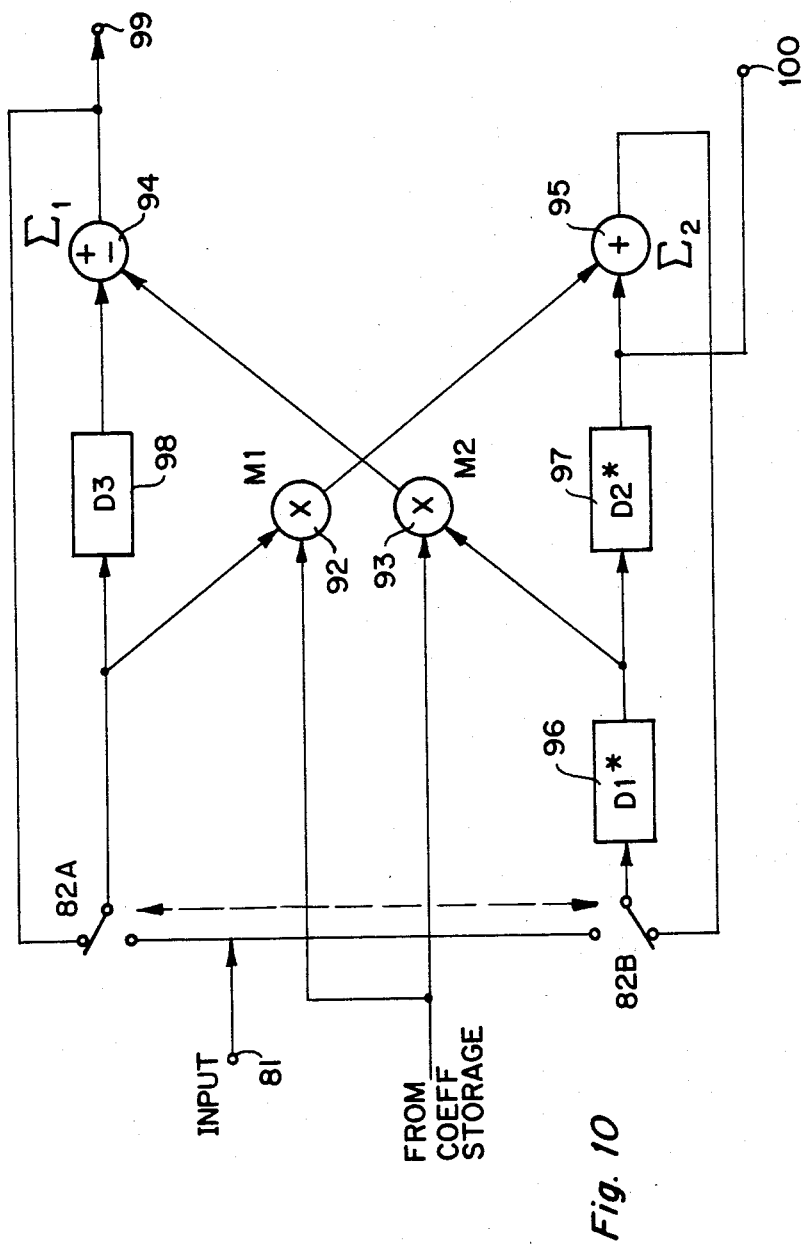
FIG. 10 is a modified form of the lattice filter block diagram of FIG. 8 showing the filter as configured for analysis recognition.

The lattice filter 20 is shown in FIG. 8. The configuration of the filter is selected by the switch 80 which has six ganged elements, 80A–80F, all shown thrown to the synthesis positions. The state of switches 80A–80F is, like the state of switches 14A–14D, controlled by the A/S signal on line 12. FIGS. 9 and 10 represent a breakdown of FIG. 8, respectively showing its adaption to synthesis and analysis uses. In FIG. 9 are shown only those components which are involved in the synthesis configuration. Similarly, FIG. 10 shows only those components which are involved in the analysis configuration. Note from those two figures that switch 82 (comprising switch sections 82A and 82B) is used only for analysis and that switch 83 (comprising switch sections 83A and 83B) is used only for synthesis. The switches, being part of the multiplexing scheme, select the input terminal as the input to the general filter section during the first processing cycle of every sample period, while the previous output of the general section is used as input during all other cycles.

The teaching of time-multiplexing is ordinarily used to save on circuitry when dealing with a cascade of identical processing steps. In this case multiplexing means that rather than building a physical realization of each of many filter sections one can build one section and direct the data through that section many times. The additional circuit elements needed for multiplexing, data switches and memory elements take up very little space on the chip compared to the space that is saved.

Before comparing the schematics to the flow graphs, the role of time delay elements is reviewed. In the flow graphs, the time delay symbol is used for only one purpose, to indicate a sample delay. In the schematics (i.e., in the physical system), time delay elements are also used for additional functions. It is realized that a physical component like a multiplier, in contrast to the symbolic multiplier of the flow graphs, needs a finite amount of time to perform its function, i.e., it does not act infinitely fast and so presents a certain time delay between input and output. This makes it necessary in some cases to use delay elements in some parts of a circuit simply to resynchronize data paths. Furthermore, in a serial digital implementation, time delays are used to define and delimit fields and for special case arithmetic (i.e., multiply by a power of 2). This means that exact sizes of the various delay elements depend on detailed design considerations outside the scope of a general description, but within the skill of those working in the art, and the sizes are consequently omitted from the figures.

The flow graph for the lattice configuration used for analysis is shown in FIG. 11. It shows a cascade of eight identical sections 102A–102H, each section consisting of two multipliers 104A–104H and 106A–106H, two adders 108A–108H and 110A–110H and one delay element 112A–112H. By comparison, the physical realization in FIG. 10 shows one single section to be multiplexed. The physical multipliers 92, 93 and adders 94, 95 are easily recognized. The eight sample delays are lumped together into two shift registers, 96 and 97. The shift register 98 has two functions. It is a storage element for one sample and also compensates for delay through the multiplier 93 so as to synchronize the two inputs to the adder 94. Shift register 97 performs the same functions for the other adder 95. The two multipliers are in phase, performing the operations for each stage simultaneously. This is different from the synthesis configuration (to be described) where the multipliers are skewed in time. The switch 82A, 82B serves to select the input terminal 81 as the section input for the first operational cycle and the previous section output for the remaining cycles. During each operational cycle, the output from a different stage is available at the output terminal 99. Because of the delays in the circuit, the output of the first stage becomes available during the second operational cycle and is at the same time fed back to become the input for the second stage. In addition to the normal output 99 the control algorithm also requires the additional output at terminal 100.

The flow graph for the synthesis configuration is shown in FIG. 12. The main difference between FIGS. 11 and 12 as drawn is the direction of data flow in the upper branch. This means that the two multiplications for each stage can no longer occur simultaneously since the output from one multiplication affects the input to the other. As a consequence, the multipliers, and also the adders, must be skewed in time. Referring to FIG. 9, the top multiplier 92 is now lagging behind the bottom multiplier 93 and consequently the application of a particular coefficient to the top multiplier must be delayed through the delay element 122. The adder 95 is also operating behind adder 94. For this reason the delay element 125 is needed for properly feeding back the output of the last stage. Furthermore the delay element 126 must be different from its analysis counterpart 97 and delay element 128 is different from 96. The term "adder" has been used throughout this description to mean programmable adder/subtractor. The function for adder/subtractor 94 for synthesis is subtract. Although the output from each stage is available at different times on the output terminal 99, only the output from the last stage (the final sample of synthesized speech) is of interest. This selection is made by the output converter 26 (of FIG. 3) at the appropriate time.

It has been stated above that the sample delays of the flow graphs, for both synthesis and analysis, are implemented using the same physical shift registers. The following is a more detailed discussion of the factors determining the register lengths in each configuration, as determined by the number of unique values which must be stored at any one time. Refer to the flow graphs in FIGS. 11 and 12. Consider the situation just after completion of processing for an arbitrary stage. In the analysis configuration, the stage output is alredy calculated but the receiving delay element has not yet been vacated, since its old value must be used in the processing of the next stage. A buffer location is thus needed and the storage requirement for the analysis configuration is one location more than the number of stages. For the synthesis configuration the situation is different. Due to the opposite direction of processing, the receiving delay element has already been vacated. This actually means that at any point in time there is one sample delay element the content of which is irrelevant. Thus with proper sequencing of the processing, the storage requirement for the synthesis configuration is one less than the number of stages.

In either configuration, time multiplexing the lattice filter block divides the sample period into a number of shorter identical periods, corresponding to the stages 102A–102H and 202A–202J in the flow graphs. The lattice filter block requires a certain minimum amount of time to implement each stage. Extending this time beyond the minimum lengthens the sample period of the filter. This provides a simple means of varying the sample period: control circuitry "freezes" the state of filter block 20 and parameter handler blocks 16 and 18 for a specified length of time at the end of each stage to increase the sampling period. In analysis configuration this lengthens the sample period by eight times the specified "freeze" interval; in synthesis configuration, ten times. A field in parameter handler block 18 specifies the length of the increase per stage, giving the microprocessor control over the sample period.

Control Algorithm

Figure 13:
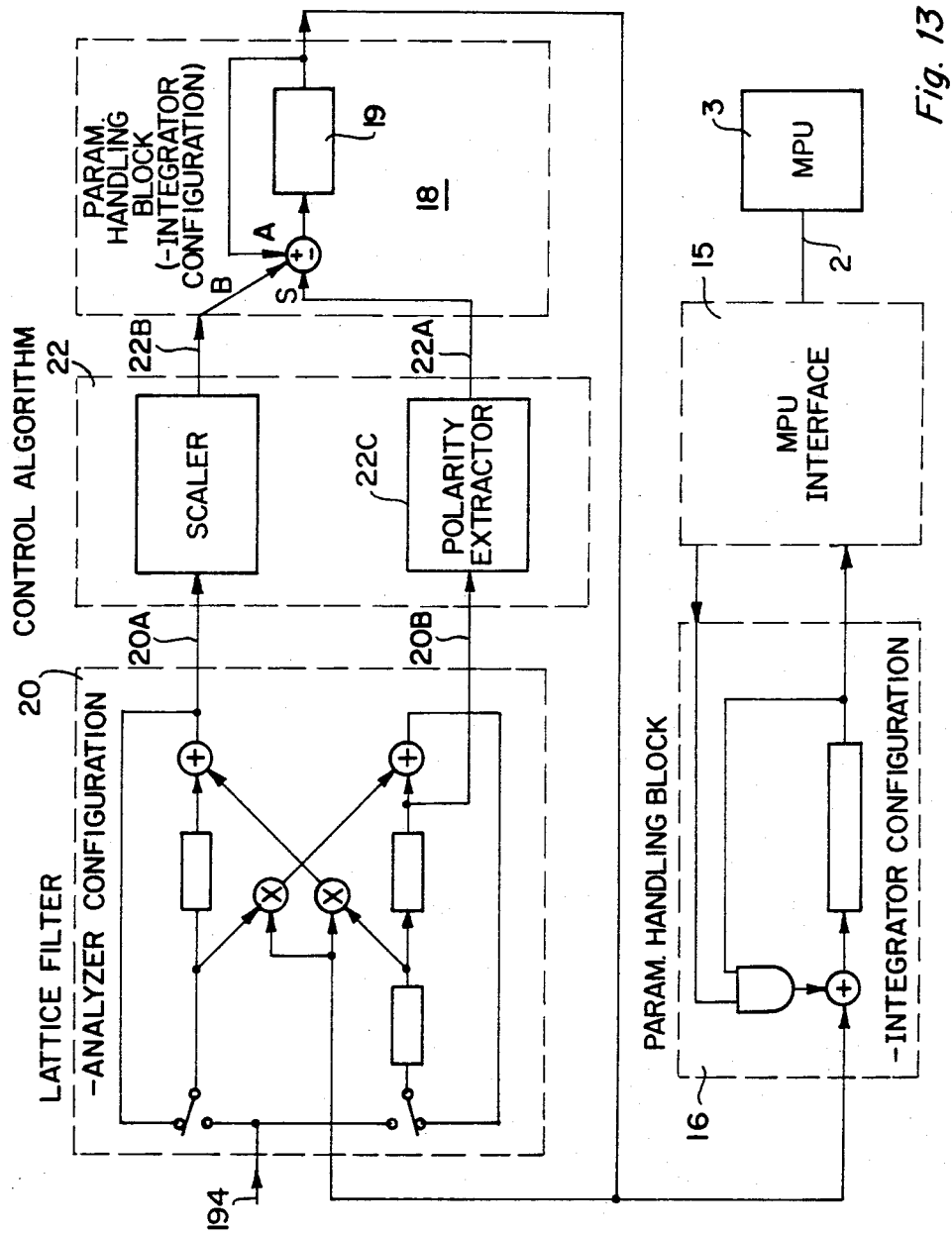
FIG. 13 is a re-drawn block diagram of the synthesizer/analyzer of FIG. 1, configured as in FIG. 5, illustrting in general the functioning and interconnection of the control algorithm to generate lattice filter coefficients.

The easiest wasy to describe the control algorithm block is to show how it fits into the control loop. This is accomplished in FIG. 13, showing part of the configuration of FIG. 5 in greater detail. Note first that the output from the all-zero lattice filter 20 consists of two signals on lines 20A and 20B, both going to the control algorithm block 22. The output from the control algorithm block 22 also consists of two signals 22A and 22B, both going to the coefficient integrator and storage block 18. It was stated above that the input to the integrator (i.e., the correction signal) is derived from the forward prediction error, or from its complement, depending on the polarity of the backward prediction error. FIG. 13 shows that this is achieved by letting the polarity of the backward prediction error (on line 22A from a polarity extractor 22C) control the sign of the integration, i.e., whether the correction signal is added to or subtracted from the value of a particular coefficient.

In the serial digital implementation the polarity extractor is simply a one-bit memory loaded at the proper time. Since the value of the scaling factor can be a power of 2 a shift register accomplishes the function of the scaler.

Excitation Source

Figure 14:
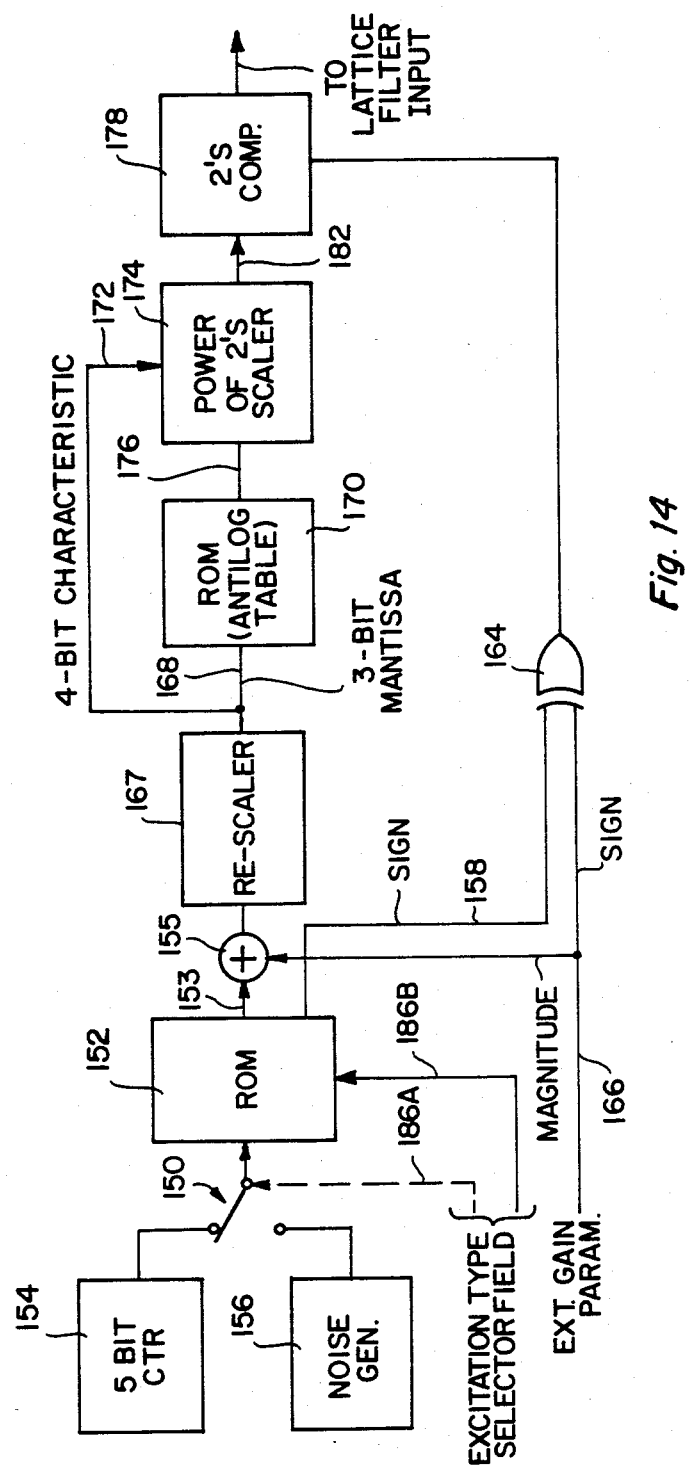
FIG. 14 is a block diagram of excitation source 24 of FIG. 2.

Starting with FIG. 14, the excitation source 24 is now explained in greater detail. The excitation source provides input to the lattice filter on a sample-by-sample basis, for speech synthesis. Several different excitation generators are contained within the excitation source; microprocessor 3 determines which generator will be used at any time. As implemented, six choices are available. Four yield internally generated sequences for synthesizing voiced speech segments. A fifth provides a Gaussian noise source for synthesizing unvoiced speech segments. The sixth allows for external excitation on a sample-by-sample basis from the microprocessor.

The first five excitation choices may be thought of as corresponding to five 32-byte ROM's (read-only memories). Choosing one of the four voiced sequences throws switch 150 and causes the corresponding ROM (part of ROM 152) to be addressed by a five-bit counter 154. Counter 154 is cleared at the beginning of each pitch period and is then incremented at the sampling frequency until it overflows. The output from the ROM 152 determines the input to the filter at each sample time, as discussed more fully below.

The four voiced excitation sequences are thus each 31 samples long; the content of the thirty-second ROM location determines the constant input to the filter after the sequence is complete, until the start of the next pitch period.

Choosing the unvoiced excitation (by throwing switch 150 to its other state) causes the corresponding ROM to be addressed by a pseudo-random number generator 156 which produces a uniform distribution of five-bit numbers. The ROM's contents shape the noise, causing the output values to have a Gaussian distribution. As explained above, the output of ROM 152 determines the input to the filter, but here the pseudo-random sequence continues after 31 samples until another excitation sequence is selected.

The output 153 of ROM 152, which feeds adder 155, is attenuated by a gain parameter provided extenally on line 166 to the same adder 155, thus allowing the hmic coding eliminates the need for a multiplier in the attenuation network, as it allows the two magnitude fields to be added by adder 155 to produce the logarithmic magnitude of the filter input. In addition, logarithmic scaling of the gain (attenuation) corresponds more closely to the perceived amplitude of the signal. An exclusive-OR gate 164 determines the sign of the filter input from the two sign signals on lines 158 and 166.

The seven-bit logarithmic magnitudes comprise a four-bit characteristic and a three-bit mantissa. To determine the logarithmic magnitude of the filter input, adder 155 adds the output from ROM 152 and the external gain parameter. Rescaler 167 rescales the result to the original range, by substracting a constant from the result. The effect is such that the external gain parameter may always be thought of as attenuating the output from ROM 152.

The filter, though, operates in the linear (not the logarithmic) domain. Consequently, an antilogarithmic conversion must be performed on the input magnitude before applying it to the filter. The 3-bit mantissa on line 168 addresses ROM 170, which contains an antilogarithm conversion table. The four-bit characteristic is supplied on line 172 to binary scaler 174 which interprets it as an integral power of two and scales the output 176 of ROM 120 accordingly. The net effect is that output 182 of scaler 174 is the antilog of the input value on line 165. If the antilog is sufficiently small, it is treated as zero; it is important that this condition be realizable, since otherwise a value of zero would be a situation requiring special treatment.

The output from scaler 174 is supplied to a two's complementer 178 which is controlled by exclusive-OR gate 164, to do a sign-multiply operation when needed. The output of two's complementer 178 supplies the actual filter input.

It should be understood that signal transfers are generally serial in FIG. 14, necessitating the use of serial-to-parallel conversion at the ROM inputs and parallel-to-serial conversion at the ROM outputs. The conversion circuits have been omitted to clarify the explanation, but it will be understood that they are needed in a physical realization.

Input Converter

Figure 15:
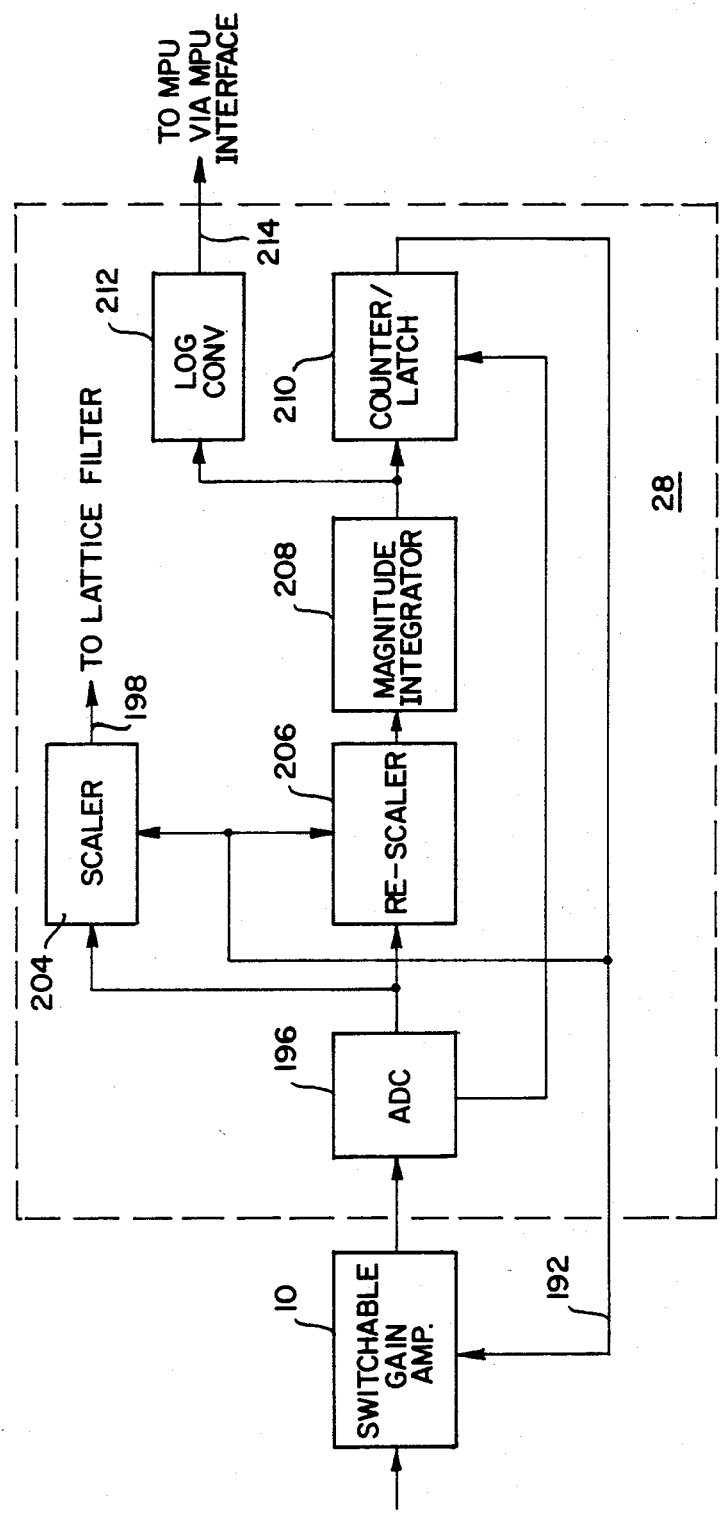
FIG. 15 is a block diagram of input converter 28 of FIG. 2.

An expanded block diagram for the input converter 28 is shown in FIG. 15. The external, switchable-gain amplifier 190, though not part of the input converter, is also shown for completeness. The input converter provides three different outputs, namely, (a) digitized, normalized speech samples on line 198 for input to the lattice filter, (b) gain control information on line 192 for amplitude normalization and (c) a measure of speech signal energy on line 214 to be read by the microprocessor. Generation of the gain control information is described first. The normalized speech signal, in the form of an analog electrical signal, enters ADC 196 from the switchable-gain amplifier 190. The output of ADC 196 is a digitized sample of the speech signal. A new value is provided every sample time. The mangitude of the digitized samples is integrated over a particular number of samples in block 208 after having been de-normalized by re-scaler 206. In effect, re-scaler 206 functions as the inverse of switchable-gain amplifier 190, such that the samples entering integrator 208 reflect the true strength of the speech signal. The number of leading zeroes in the 20-bit representation of the output from block 208 becomes the gain control code for amplitude normalization. A number greater than seven is set equal to seven. The gain control code thus determined is latched in the counter/latch 210 and placed on line 192. This gain control code specifies a particular power-of-2 gain for the switchable-gain amplifier 190 via line 192. The integration interval, which is also the gain update interval, is determined by a timer originally set by the processor 3. Counter/latch 210 is decremented by one whenever overflow is detected by ADC 196.

The truncated output of block 208 is converted to logarithmic form by block 212 and then is made available to the processor. The six-bit logarithmic format consists of a four bit characteristic, which is the gain control code inverted, and a two-bit mantissa, derived from the four most significant bits of the magnitude integral by a simple gate array.

The output from ADC 196 also becomes the input to the lattice filter (on line 198) after passing thru a programmable scaler 204. The scaler further amplifies the speech signal, thereby helping the normalization process for very low signals, i.e., for leading-zero counts greater than 7. The scaler is limited to a range of 4-bit positions.

The foregoing description is limited to a single specific embodiment of this invention, but it will be apparent that this invention can be practiced in signal processing systems having diverse basic construction or in systems using different internal circuitry or design while nevertheless achieving some or all of the foregoing objects and advantages of this invention. Therefore, it is the object of the appended claims to cover all such variations, modifications and obvious improvements as come within the true spirit and scope of this invention.

What is claimed is:

1. An apparatus for synthesizing speech from stored representations and for generating representations of speech for use in speech analysis, including but not limited to speech recognition, such apparatus being reconfigurable between the two functions and comprising:
  A. a lattice filter including elements which are configurable selectively to provide an all-pole transfer function for synthesis and an all-zero transfer function for analysis, the lattice filter being responsive to coefficients supplied thereto;
  B. an input converter for converting analog representations of acoustic waveforms to signals suitable for processing by said all-zero lattice filter;
  C. an output converter coupled to said all-pole reconfigured lattice filter for coverting the output signals from said filter to analog signals suitable for conversion into acoustic waveforms;
  D. an excitation source for supplying to the input of said all-pole filter signals representing vocal tract excitation;
  E. a filter coefficient correction means for modifying lattice filter coefficients responsive to a speech signal being analyzed, to generate representations of such speech;
  F. means for receiving filter coefficients for speech synthesis;
  G. means for selectively interconnecting, for speech synthesis or analysis, the lattice filter, the input converter, the output converter, the excitation source, the filter coefficient correction means and the coefficient receiving means.

2. An apparatus for synthesizing speech from stored representations and for generating representations of speech for use in speech analysis, including but not limited to speech recognition, such apparatus being reconfigurable between the two functions and comprising:
  A. a lattice filter selectively configurable to have an all-pole transfer function for synthesis and an all-zero transfer function for analysis, the lattice filter being responsive to coefficients supplied thereto;
  B. an input inverter for converting analog representations of acoustic waveforms to signals suitable for processing by said all-zero lattice filter;
  C. an output converter coupled to said all-pole reconfigured lattice filter for coverting the output signals from said filter to analog signals suitable for conversion into acoustic waveforms;
  D. an excitation source for supplying to the input of said all-pole filter signals representing vocal tract excitation;
  E. a filter coefficient correction means for modifying lattice filter coefficients responsive to a speech signal being analyzed, to generate representations of such speech, and comprising
    1. a feedback control means for adapting the response of said lattice filter to signals from said input converter, and
    2. a coefficient integrator and storage means coupled to said feedback control means for integrating the output of said feedback control means and storing the results of the integration, said results being a set of coefficients characteristic of the input acoustic waveform;
  F. means for receiving filter coefficients for speech synthesis;
  G. means for selectively interconnecting, for speech synthesis or analysis, the lattice filter, the input converter, the output converter, the excitation source, the filter coefficient correction means and the coefficient receiving means.

3. An apparatus as defined in claim 2, further comprising a coefficient averager and buffer coupled to said coefficient integrator and storage means for time-averaging each of the said coefficients.

4. An apparatus as defined in claim 3 wherein the feedback control means includes a means for multiplying the scaled forward prediction error from each stage of said lattice filter by the sign of the backward prediction error from that same stage.

5. An apparatus as defined in claims 1, 2, 3 or 4 wherein said input converter means includes a means for normalizing the amplitude of the input to said lattice filter, whereby the time required to achieve a set of filter coefficients representing the input acoustic waveform is substantially independent of the amplitude of the input acoustic waveform.

6. An apparatus as defined in claim 5 in which the amplitude normalizing means include:
  A. a variable gain circuit;
  B. means for controlling the gain of the variable gain circuit in accordance with the average amplitude of the input acoustic waveform over a predetermined length of time; and
  C. means for effecting a reduction in the gain of the variable gain circuit in response to an instantaneous acoustic waveform amplitude in excess of a threshold corresponding to the gain of the variable gain circuit immediately before the gain reduction.

7. An apparatus as defined in claim 2 including means for configuring the coefficient integrator and storage means, when the lattice filter is in its all-pole configuration, as a working storage that holds the filter coefficients and applies them to the filter during speech synthesis.

8. An apparatus as defined in claim 3 including means for configuring the coefficient integrator and storage means, when the lattice filter is in its all-pole configuration, as working storage that holds the filter coefficients and applies them to the filter during speech synthesis.

9. An apparatus as defined in claim 8 including means for configuring the coefficient averager and buffer, when the lattice filter is in its all-pole configuration, to serve as a buffer for temporarily storing filter coefficients received by said receiving means and then transferring the coefficients to said working storage.

10. An apparatus as defined in claim 2 in which said coefficient integrator and storage means includes:
  A. a shift register having an input end and an output end;
  B. an adder having first and second input terminals and providing an output that is the sum of the inputs applied to its input terminals;
  C. means applying the adder output to the input end of the shift register;
  D. a first gate for selectively connecting the output end of said shift register to the first input terminal of the adder, and
  E. a second gate for selectively applying an input to the second input terminal of the adder.

11. An apparatus as defined in claim 10:
A. in which said feedback control means develops a scaled value of the forward prediction error from said lattice filter; and
B. including means for selectively applying said scaled value to said second gate when said lattice filter is in its all-zero configuration.

12. An apparatus as defined in claim 11 in which:
A. said adder responds to a sign signal by adding its input signals when the sign signal has a first state and subtracting one of its inputs from the other when the sign signal has a second state; and
B. said control means includes means for developing the sign signal in response to the sign of the backward prediction error from said lattice filter.

13. An apparatus as defined in claim 1 including
A. a first controllable scaler for controlling the amplitude of the excitation applied to said lattice filter when the filter is in its all-pole configuration; and
B. a second controllable scaler for adjusting the amplitude of the output of said lattice filter, whereby the maximum amplitude of the signal passing through the filter may be maintained substantially at the maximum amplitude of which the filter is capable, thereby to minimize noise, and the amplitude of the output from the output converter may be adjusted to generate the overall energy variations in the speech signal being synthesized.

14. An apparatus as defined in claim 10:
A. in which said shift register contains a plurality of fields holding filter coefficients and at least one field holding an elapsed time;
B. including means for applying a fixed number to said second adder input terminal when said time field is applied to said first adder input, thereby to change said elapsed time by a fixed amount on each recirculation of said shift register, and
C. including means for detecting a predetermined value of said elapsed time.

* * * * *